United States Patent
Chen et al.

(10) Patent No.: US 10,853,149 B2
(45) Date of Patent: Dec. 1, 2020

(54) UPDATING INFERENCE GRAPH ABSENT NODE LOCKING

(71) Applicant: ENTIT Software LLC, Sunnyvale, CA (US)

(72) Inventors: Fei Chen, Palo Alto, CA (US); Nandish Jayaram, Palo Alto, CA (US); Maria Teresa Gonzalez Diaz, Palo Alto, CA (US); Krishnamurthy Viswanathan, Palo Alto, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 157 days.

(21) Appl. No.: 15/571,123

(22) PCT Filed: May 19, 2015

(86) PCT No.: PCT/US2015/031499
§ 371 (c)(1),
(2) Date: Nov. 1, 2017

(87) PCT Pub. No.: WO2016/186651
PCT Pub. Date: Nov. 24, 2016

(65) Prior Publication Data
US 2018/0173574 A1 Jun. 21, 2018

(51) Int. Cl.
*G06F 9/44* (2018.01)
*G06F 9/52* (2006.01)
*G06N 5/04* (2006.01)

(52) U.S. Cl.
CPC ............... *G06F 9/522* (2013.01); *G06N 5/04* (2013.01)

(58) Field of Classification Search
CPC ........................................................ G06F 9/44
See application file for complete search history.

(56) References Cited

U.S. PATENT DOCUMENTS

| | | | | |
|---|---|---|---|---|
| 6,571,146 | B1 * | 5/2003 | Dennehy | G06T 17/10 345/420 |
| 7,512,950 | B1 * | 3/2009 | Marejka | G06F 9/52 718/102 |
| 8,200,640 | B2 * | 6/2012 | Arasu | G06F 16/24556 707/692 |
| 9,251,491 | B2 * | 2/2016 | Chao | G06Q 10/06 |
| 2005/0257221 | A1 * | 11/2005 | Inchingolo | G06Q 10/06 718/100 |

(Continued)

OTHER PUBLICATIONS

Lock-Free Data-Structure Iterators (Year: 2013).*

(Continued)

*Primary Examiner* — Jae U Jeon

(57) ABSTRACT

Example implementations relate to updating an inference graph absent node locking. For example, a processor executing a first thread may receive a first task for updating a node of an inference graph stored by a storage device accessible to a second thread, the first task being assigned during a first iteration of a graph update loop. Absent locking the node from access by the second thread, the processor may generate a value for the node and update the node with the value. Based on detecting that each node of the inference graph has been updated, the processor may continue with a second iteration of the graph update loop.

19 Claims, 3 Drawing Sheets

(56) References Cited

U.S. PATENT DOCUMENTS

| | | | |
|---|---|---|---|
| 2010/0057792 A1* | 3/2010 | Ylonen | G06F 12/0253 |
| | | | 707/E17.009 |
| 2010/0131953 A1 | 5/2010 | Dice et al. | |
| 2012/0297394 A1 | 11/2012 | Alle | |
| 2013/0014118 A1 | 1/2013 | Jones | |
| 2013/0074080 A1 | 3/2013 | Jimenez et al. | |
| 2013/0132961 A1 | 5/2013 | Lehavi et al. | |
| 2013/0346984 A1 | 12/2013 | Andrianov | |
| 2014/0013330 A1 | 1/2014 | Wang et al. | |
| 2014/0049549 A1* | 2/2014 | Lukyanov | G06T 1/60 |
| | | | 345/522 |
| 2014/0114443 A1* | 4/2014 | Bernstein | G06N 3/0635 |
| | | | 700/49 |
| 2014/0137129 A1 | 5/2014 | Jacob et al. | |
| 2016/0048607 A1* | 2/2016 | Raman | G06F 16/90335 |
| | | | 707/798 |
| 2016/0055423 A1* | 2/2016 | Buchanan | G06N 7/005 |
| | | | 706/12 |

OTHER PUBLICATIONS

Petrank ("Lock-Free Data-Structure Iterators") (Year: 2013).*

Cong, G. et al.; "Lock-free Parallel Algorithms: an Experimental Study"; Jul. 25, 2014; http://citeseerx.ist.psu.edu/viewdoc/download?doi=10.1.1.187.4860&rep=rep1&type=pdf.

Holt, B. et al., "Flat Combining Synchronized Global Data Structures"; Aug. 29, 2013; http://sampa.cs.washington.edu/papers/holt-pgas13.pdf.

Then, M. et al.:"The More the Merrier: Efficient Multi-source Graph Traversal"; Oct. 29, 2014; http://www-db.in.tum.de/~kaufmann/papers/msbfs.pdf.

International Searrch Report and Written Opinion dated Feb. 4, 2016 for PCT Application No. PCT/US2015/031499, Filed May 19, 2015, 9 pages.

Blei, David, et al.; "Latent Dirichlet Allocation"; Journal of Machine Learning Research 3 (2003); Published Jan. 2003; pp. 993-1022, 30 pp.

Finkel, Jenny Rose, et al.; "Incorporating Non-local Information into Information Extraction Systems by Gibbs Sampling"; 43rd Annual Meeting of the ACL; Jun. 2005; pp. 363-370, 8 pp.

Johnson, Matthew, et al.; "Analyzing Hogwild Parallel Gaussian Gibbs Sampling."; Advances in Neural Information Processing Systems; 2013; 9 pp.

Low, Yucheng, et al.; "GraphLab: A New Framework for Parallel Machine Learning"; preprint arXiv: 1006.4990v1 ; Jun. 25, 2010; 11 pp.

Manadhata, Pratyusa, et al.; "Detecting Malicious Domains via Graph Inference"; Hewlett-Packard Laboratories, Damballa Inc.; ESORICS 2014, Part I, LNCS 8712; pp. 1 18.

Smola, Alexanderr; "An Architecture for Parallel Topic Models"; Proceedings of the VLDB Endowment, vol. 3, No. 1; 2010; pp. 703-710, 8 pp.

Tamersoy, Acar et al.; "Guilt by Association: Large Scale Malware Detection by Mining File-relation Graphs"; KDD'14; Aug. 24-27, 2014; 11 pp.

* cited by examiner

UPDATING INFERENCE GRAPH ABSENT NODE LOCKING

BACKGROUND

Bioinformatics, computer vision, text analytics, finance and marketing analytics, and other fields may use statistical inferences to generate predictions of expected classifications, labels, or outcomes. Such systems may, by way of example and not limitation, be configured to determine a number of people that are likely to shop at a particular store on a given day, a candidate a voter may likely vote for, and so forth.

BRIEF DESCRIPTION OF THE DRAWINGS

Some examples of the present application are described with respect to the following figures.

DETAILED DESCRIPTION

Figure 1:
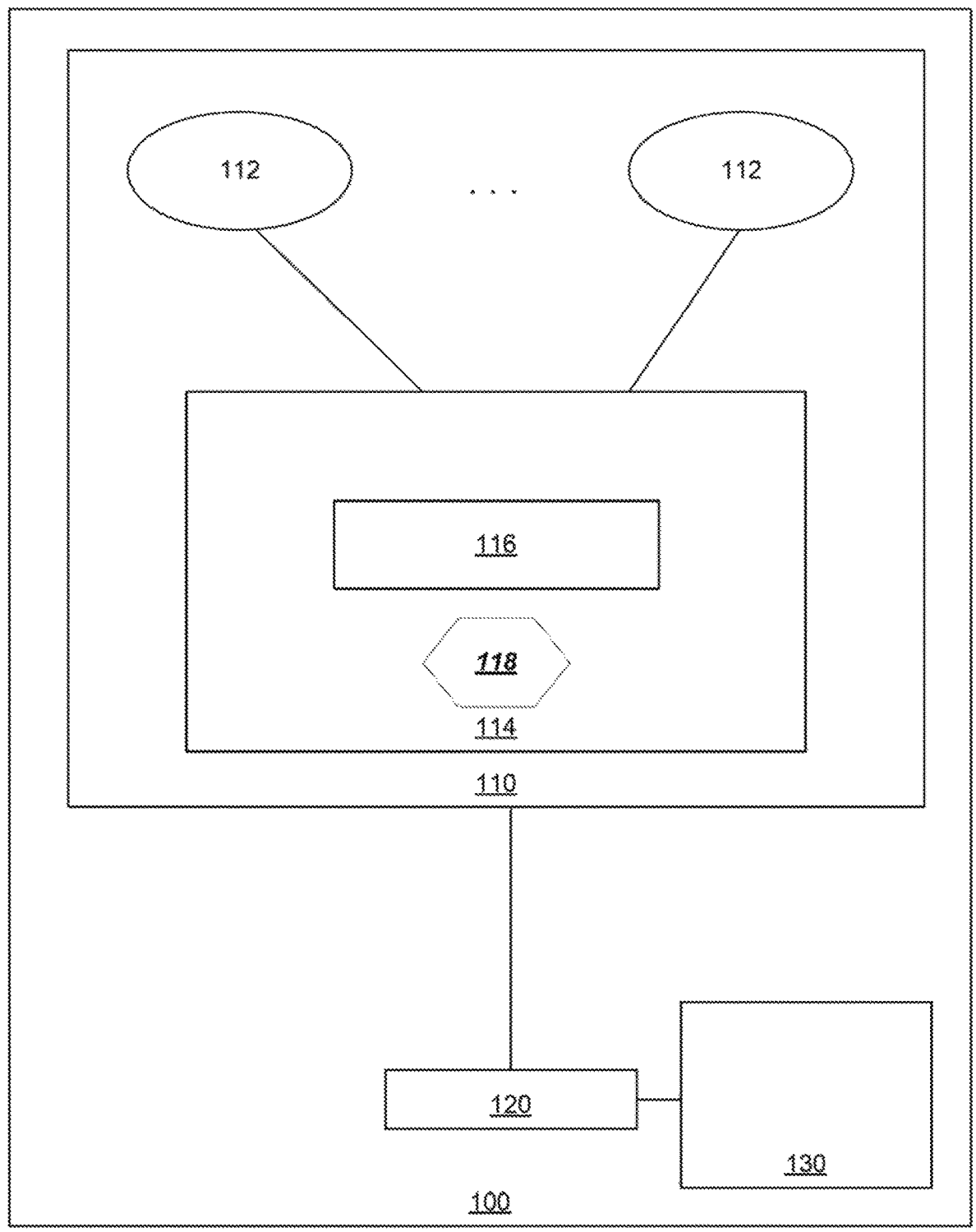
FIG. 1 is a schematic diagram of an example computer device for assigning tasks to threads updating an inference graph absent any locks.

To generate prediction models, a computer system may use training data that includes a number of samples for a given feature or set of features. Using the training data, the computer system can create, for example, a histogram for a feature that can in turn be used to build or otherwise train the prediction model.

Graphical models are graphs which compactly represent the joint distributions of random variables. Graph inference algorithms, such as Gibbs sampling, may be used to infer distributions of variables in inference graphs, which are graphical models that compactly represent inferences of joint distributions of random variables. These algorithms may be used in various applications, such as malware detection, detecting malicious domains, topic modeling, information extraction, image processing analytics, text analytics, and the like. In many of these applications, the graphical models are of large scale, often requiring a large number of random accesses of nodes and/or edges of the graphical model. Parallelization of graph inference algorithms may be used for large scale graph inference, but current techniques may do so inefficiently. As such, running graph inference algorithms, even in parallel, may be time consuming and inefficient, sometimes taking hours to finish on hundreds of machines.

Various parallelization computing modes may be used to perform graph inference algorithms in multi-core processing environments such that each processor in the multi-core processing environment may concurrently execute a thread associated with the graph inference algorithm, where a thread may be a sequence of programmed instructions that may be managed independently by a scheduler. Each thread may consist of any number of tasks assigned to each thread by a scheduler of the multi-core processing environment. A parallelization computing mode may include a bulk synchronization parallelization (BSP) mode, which may consist of a sequence of super steps performed by threads, where the threads communicate with one another only at the end of each super step at a barrier. A barrier may be a point during processing of a thread at which the processing must stop and may not proceed until all other concurrently processing threads reach the same barrier. After a barrier is reached, each thread obtains a copy of the same consistent global state. Within each super step, each thread may work on their own copy of the global state and may only update their own copy. The global states of each thread may be communicated to other threads at each barrier.

Another parallelization computing mode may include asynchronous parallelization, where each thread shares the same global data structure (e.g., the topology of the graphical model and the value of each vertex in the model) and each thread updates that global data structure concurrently. Each thread may see updates from other threads as the updates are performed, and each thread may not need to wait for any other threads in order to process tasks (e.g., tasks may be processed without barriers). At any time, a thread may pick up a task and proceed with processing the task.

In some examples, graph inference algorithms may be parallelized efficiently using a lock-free in-memory graph inference engine for multi-core environments based on a hybrid computing mode of asynchronous parallelization and BSP. Each thread may share the same global data structures and may update the global state concurrently. Each thread may see updates from other threads as the data structures are updated. A barrier may be enforced periodically such that, when the barrier is reached, a thread may wait for other threads to finish their tasks before that thread may proceed to its next task. When threads update the global state, they may do so without acquiring locks. As such, when a thread updates a node, the thread may perform the update without locking the node.

For example, a processor core executing a thread may receive a task for updating a node of an inference graph, where the inference graph may be stored by a storage device accessible to other concurrently-running threads. The task may be assigned to that particular thread for a particular iteration of a graph update loop. The graph update loop may be a loop that iterates a graph inference algorithm such that nodes of the inference graph may be updated during each iteration of the loop. When the task assigned to the thread is performed, a value for the node to be updated may be generated, and that node may be updated with that value, without locking the node from access by the other concurrently-running threads. Once each node of the inference graph has been updated during that iteration of the graph update loop, a second iteration of the graph update loop may be performed. A barrier may be used to prevent threads from starting that next iteration until all threads have finished their respective tasks associated with the previous iteration.

Various sweep strategies may be used to update nodes of an inference graph after each iteration of the graph update loop. A sweep strategy may be an order in which nodes of an inference graph are updated. In a sequential sweep strategy, all of the nodes of the inference graph may be updated in any order, where the order that is chosen is used for all iterations of the graph update loop. In a shuffling sweep strategy, in each iteration, a random permutation of all of the nodes is generated, and the nodes are updated according to that permutation order for that iteration. In a random sweep strategy, a complete sweep of all nodes is not performed, but instead, at least one node of the inference graph is randomly chosen to be updated for a particular iteration.

Referring now to the figures, FIG. 1 is a schematic diagram of an example computer device 100 for assigning tasks to threads updating an inference graph absent any locks. The computer device 100 is a physical machine that is constructed from actual machine executable instructions, or "software," and actual hardware. The hardware of the computer device 100 includes a processing node 110, which may be part of, for example, a particular multicore central processing unit (CPU) package or multiple multicore CPU packages. As depicted in FIG. 1, the processing node 110 contains CPU processor cores 112 and a local memory 114. A CPU processor core may be a processor device suitable to read and execute processor executable instructions, such as a CPU, or an integrated circuit configured to perform a configured function.

The local memory 114 may be a storage device that stores, among other things, CPU executable instructions and data, such as graph update instructions 116 and a plurality of tasks 118. The plurality of tasks 118 may be data that represents any number of tasks to be processed in threads by the CPU processor cores 112. For example, the graph update instructions 116 may be instructions to a first iteration of a graph update loop that, when executed by one of the CPU processor cores, may cause the CPU processor core to select a first subset of tasks and a second subset of tasks from the plurality of tasks 118, where each task in the plurality of tasks 118 corresponds to an update to a respective node of an inference graph. The inference graph may be a shared data structure accessible to both the first thread and the second thread. The graph update instructions 116 may cause the CPU processor core to assign the first subset of tasks to a first thread and assign the second subset of tasks to a second thread, where the first thread and the second thread update the inference graph absent any locks. The graph update instructions 116 may cause the CPU processor core to execute a second iteration of the graph update loop responsive to detecting that the first thread and the second thread have completed the first subset of tasks and the second subset of tasks.

The graph update instructions 116 may also include instructions to the second iteration of the graph update loop that, when executed, cause the CPU processor core to select a third subset of tasks and a fourth subset of tasks from the plurality of tasks 118, assign the third subset of tasks to the first thread, and assign the fourth subset of tasks to the second thread. In some examples, the selection of the first subset of tasks, the second subset of tasks, the third subset of tasks, and the fourth subset of tasks is based on an ordering of the nodes of the inference graph. In some examples, the ordering of the nodes of the inference graph may be updated according to a random permutation after detecting that the first thread and the second thread have completed the first subset of tasks and the second subset of tasks.

FIG. 1 also depicts that the processing node 110 may be coupled to a persistent memory 130 (a non-volatile memory, such as flash memory, for example) that may be accessed by the CPU processor cores 112 via the memory hub 120. The persistent memory 130 may store persistent copies of the graph update instructions 116 and the plurality of tasks 118.

Figure 2:
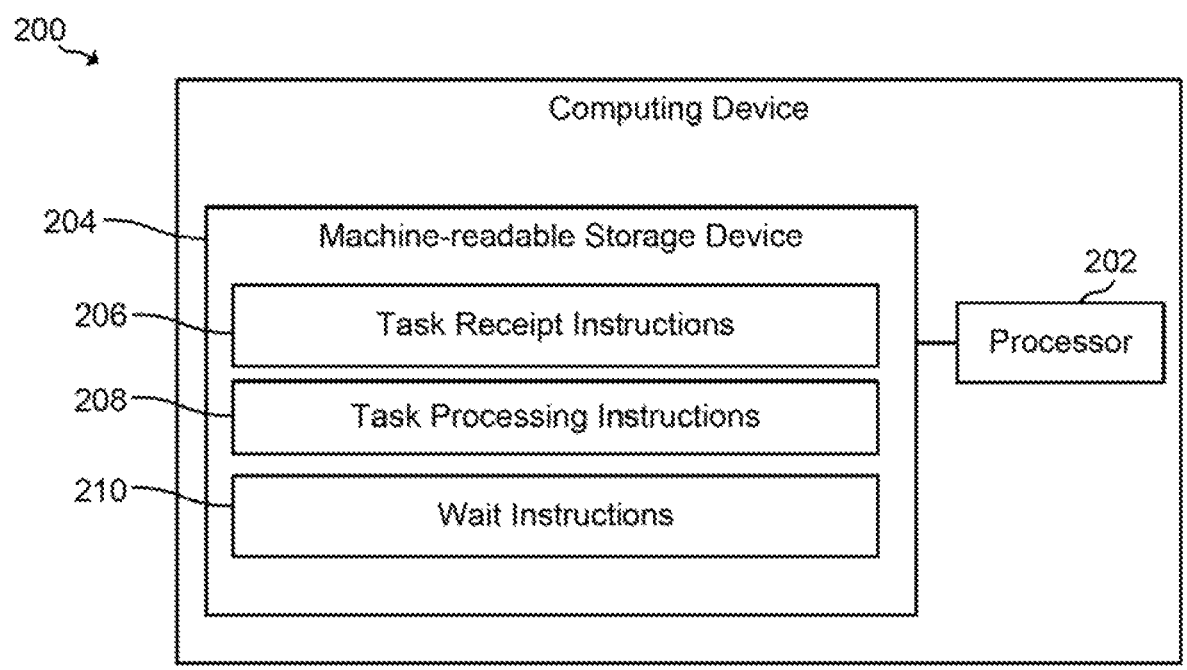
FIG. 2 is a block diagram of an example computing device for processing task lists based on updating values of nodes absent locking the nodes.

FIG. 2 is a block diagram of an example computing device 200 for processing task lists based on updating values of nodes absent locking the nodes. In some examples, computing device 200 may be similar to the computer device 100 of FIG. 1.

Computing device 200 may be, for example, a web-based server, a local area network server, a cloud-based server, a notebook computer, a desktop computer, an al-in-one system, a tablet computing device, a mobile phone, an electronic book reader, a printing device, or any other electronic device suitable for processing task lists based on updating values of nodes absent locking the nodes. Computing device 200 may include a processor 202 and a machine-readable storage medium 204. Computing device 200 may receive a first task list with tasks corresponding to a subset of nodes in an inference graph and process the first task list based on updating values of the subset of nodes absent locking the subset of nodes.

Processor 202 is a tangible hardware component that may be a CPU, a semiconductor-based microprocessor, and/or other hardware device suitable for retrieval and execution of instructions stored in machine-readable storage medium 204. Processor 202 may fetch, decode, and execute instructions 206, 208, and 210 to control a process of processing task lists based on updating values of nodes absent locking the nodes. As an alternative or in addition to retrieving and executing instructions, processor 202 may include at least one electronic circuit that includes electronic components for performing the functionality of instructions 206, 208, 210, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an EPROM, an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, and 210 for receiving a first task list, where tasks in the first task list correspond to a subset of nodes in an inference graph, the values of the subset of nodes being stored in a shared data structure accessible to another processor executing a thread; processing the first task list based on updating the values of the subset of nodes absent locking the subset of nodes; and after processing the first task list, waiting for the thread executing on the other processor to finish execution of a second task list.

Task receipt instructions 206 may manage and control the receipt of task lists with tasks to be executed by the processor 202. For example, task receipt instructions 206 may receive a first task last, where tasks in the first task list correspond to a subset of nodes in an inference graph and where the values of the subset of nodes are stored in a shared data structure accessible to another processor executing a thread. The other processor may be another processor that may concurrently update the values of the inference graph with the processor 202.

Task processing instructions 208 may manage and control the processing of task lists. For example, task processing instructions 208 may process the first task list based on updating the values of the subset of nodes absent locking the subset of nodes. In some examples, the subset of nodes may include a first node, and, during an iteration of a graph update loop, the first node may be updated based on a value of a second node, where the second node may be updated by the thread executing on the other processor.

Wait instructions 210 may wait for threads executing on other processors to finish execution of other task lists. For example, after processing the first task list, the wait instructions 210 may wait for the thread executing on the other processor to finish execution of a second task list. In some examples, a barrier may be used to wait for the thread executing on the other processor to finish the execution of the second task list. In some examples, the first task list and the second task list may correspond to different nodes in the inference graph.

Figure 3:
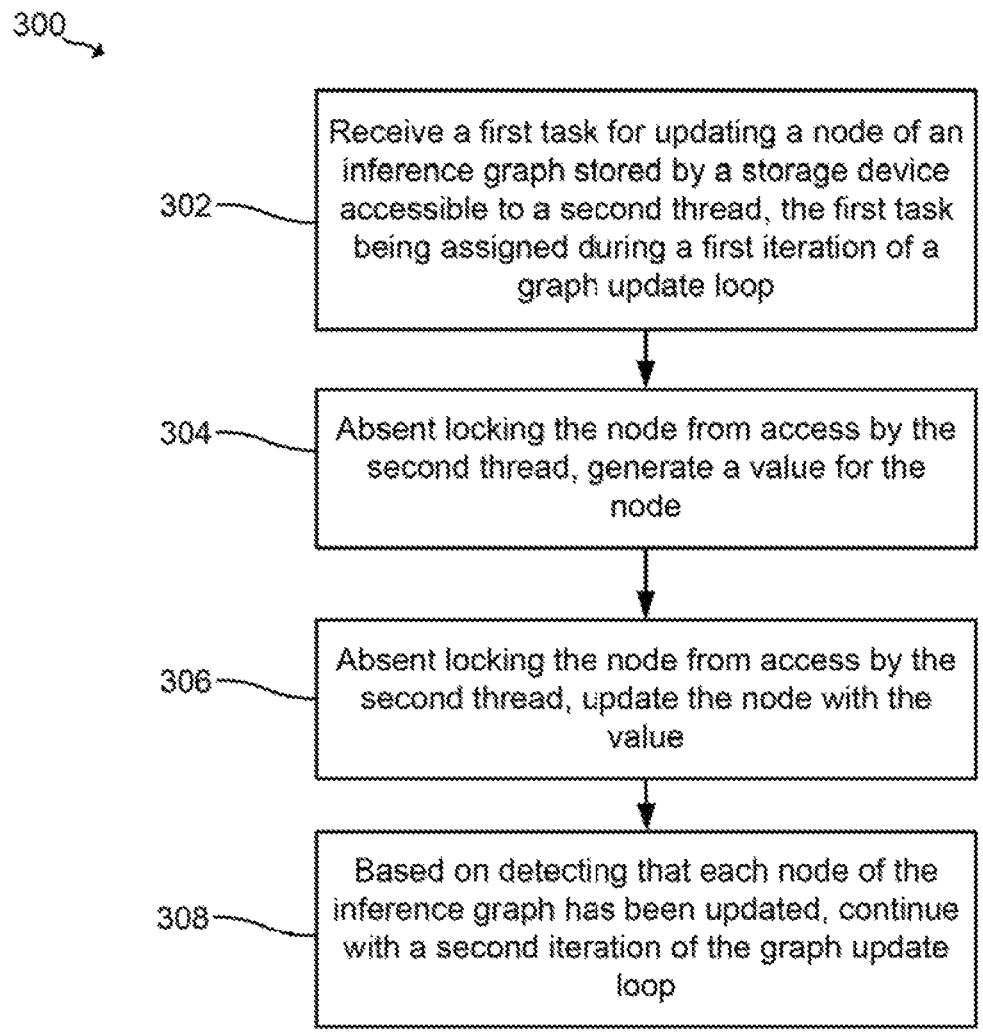
FIG. 3 is a flowchart of an example method for updating nodes of an inference graph absent locking the nodes.

FIG. 3 is a flowchart of an example method 300 for updating nodes of an inference graph absent locking the nodes. In some examples, method 300 may be implemented using computer device 100 of FIG. 1 and/or computing device 200 of FIG. 2.

Method 300 includes, at 302, receiving a first task for updating a node of an inference graph stored by a storage device accessible to a second thread, where the first task is assigned during a first iteration of a graph update loop. The first task may be part of a subset of a plurality of tasks, where each task from the plurality of tasks is assigned to update a respective node of the inference graph.

Method 300 also includes, at 304, absent locking the node from access by the second thread, generating a value for the node. The value of the node may depend on values of nodes neighboring the node. For example, the value of the node may be a value that is based on and/or derived from values of those neighboring nodes.

Method 300 also includes, at 306, absent locking the node from access by the second thread, updating the node with the value.

Method 300 also includes, at 308, based on detecting that each node of the inference graph has been updated, continuing with a second iteration of the graph update loop. In some examples, detecting that each node of the inference graph has been updated may include coordinating the first thread and the second thread with a barrier. For example, the first thread and the second thread may execute in coordination based on a barrier.

In some examples, as part of the second iteration, a second task for updating a different node of the inference graph may be received. Absent locking the different node from access by the second thread, a value for the different node may be generated, and the different node may be updated with the value. Based on detecting that each node of the inference graph has been updated, a third iteration of the graph update loop may be continued.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A method comprising:
receiving, by a processor executing a first thread, a first task for updating a first node of a plurality of nodes of an inference graph stored by a storage device, wherein a second thread has a first lock-free access to the inference graph during a first iteration of a graph update loop in which a graph inference algorithm is applied to update the plurality of nodes, the first task being assigned to the first thread for the first iteration, and a second task for updating a second node of the plurality of nodes being assigned to the second thread during the first iteration;
while the second thread has the first lock-free access to the inference graph during the first iteration:
generating, by the processor, a first value for the first node; and
updating, by the processor, the first node with the first value;
the processor ceasing the execution of the first thread in response to the execution of the first thread reaching a first barrier; and
in response to the execution of the first thread reaching the first barrier and an execution of the second thread reaching a second barrier, continuing with a second iteration of the graph update loop.

2. The method of claim 1, wherein the first task and the second task are part of a subset of a plurality of tasks, and each task of the plurality of tasks being assigned to update a node of the plurality of nodes.

3. The method of claim 1, wherein the second thread has a second lock-free access to the inference graph during the second iteration, the method further comprising, as part of the second iteration:
receiving, by the processor, a third task for updating the second node;
while the second thread has the second lock-free access to the inference graph during the second iteration:
generating, by the processor, a second value for the second node; and
updating, by the processor, the second node with the second value; and
based on detecting that each node of the plurality of nodes has been updated during the second iteration, continuing with a third iteration of the graph update loop.

4. The method of claim 1, wherein the first value depends on values of nodes of the plurality of nodes neighboring the first node.

5. The method of claim 1, further comprising:
in response to the execution of the first thread reaching the first barrier, the processor communicating a global status of the first thread to the second thread.

6. The method of claim 1, further comprising:
updating an ordering of the plurality of nodes according to a random permutation after the first iteration and before the second iteration.

7. A device comprising:
at least one processor, wherein the at least one processor comprises a first processor to execute a first thread; and
a machine-readable storage device comprising instructions that, when executed by the at least one processor, cause the at least one processor to:
receive a first task for updating a first node of a plurality of nodes of an inference graph stored by a storage device, wherein a second thread has a lock-free access to the inference graph during a first iteration of a graph update loop in which a graph inference algorithm is applied to update the plurality of nodes, the first task being assigned to the first thread for the first iteration, and a second task for updating a second node of the plurality of nodes being assigned to the second thread during the first iteration;

while the second thread has the lock-free access to the inference graph during the first iteration:
generate a first value for the first node; and
update the first node with the first value;
cease the execution of the first thread in response to the execution of the first thread reaching a first barrier; and
in response to the execution of the first thread reaching the first barrier and an execution of the second thread reaching a second barrier, continue with a second iteration of the graph update loop.

8. The device of claim 7, wherein the instructions, in association with the second iteration, further cause the at least one processor to:
select a first subset of tasks and a second subset of tasks from a plurality of tasks;
assign the first subset of tasks to the first thread; and
assign the second subset of tasks to the second thread.

9. The device of claim 8, wherein the selection is based-on an ordering of the plurality of nodes.

10. The device of claim 9, wherein the instructions, when executed by the at least one processor, further cause the at least one processor to update the ordering after the first iteration and before the second iteration.

11. The device of claim 7, wherein the instructions, when executed by the at least one processor, further cause the at least one processor to, in response to the execution of the first thread reaching the first barrier, communicate a global status of the first thread to the second thread.

12. The device of claim 7, wherein the first value depends on values of nodes of the plurality of nodes neighboring the first node.

13. A machine-readable storage device comprising instructions that, when executed, cause a first processor to:
receive a first task list, wherein the first task list is associated with a first iteration to update a plurality of nodes of an inference graph, tasks in the first task list correspond to a subset of nodes of the plurality of nodes, and values of the subset of nodes being stored in a shared data structure;
process the first task list based on updating the values of the subset of nodes, wherein the shared data structure is accessible to a second processor other than the first processor by a thread executing on the second processor, and processing the first task list comprises the first processor accessing the shared data structure while the second processor has a lock-free access to the shared data structure; and
after processing the first task list, wait for the thread executing on the second processor to finish execution of a second task list associated with the first iteration before executing tasks associated with updating the plurality of nodes in a second iteration.

14. The machine-readable storage device of claim 13, wherein the first processor and the second processor concurrently update the inference graph.

15. The machine-readable storage device of claim 13, wherein the subset of nodes includes a first node, and wherein the instructions, when executed, further cause the first processor to, during an iteration of a graph update loop, update the first node based on a value of a second node of the plurality of nodes, the second node being updated by the thread executing on the second processor, and the graph update loop comprises an execution loop in which a graph inference algorithm is applied to update the inference graph.

16. The machine-readable storage device of claim 13, wherein the instructions, when executed, further cause the first processor to use a barrier to wait for the thread executing on the second processor to finish the execution of the second task list.

17. The machine-readable storage device of claim 13, wherein the first task list and the second task list correspond to different nodes of the plurality of nodes.

18. The machine-readable storage device of claim 13, wherein the inference graph comprises a plurality of nodes, and a value for a first node of the plurality of nodes depends on values of nodes of the plurality of nodes neighboring the first node.

19. The machine-readable storage device of claim 13, wherein the instructions, when executed, further cause the first processor to process the first task list to update the values of the subset of nodes by performing an iteration of a graph inference algorithm.

* * * * *